(12) United States Patent
Nakashima

(10) Patent No.: US 10,521,079 B2
(45) Date of Patent: Dec. 31, 2019

(54) VEHICLE-MOUNTED INFORMATION DEVICE

(71) Applicant: CLARION CO., LTD., Saitama (JP)

(72) Inventor: Taro Nakashima, Saitama (JP)

(73) Assignee: CLARION CO., LTD., Saitama-Shi, Saitama (JP)

( * ) Notice: Subject to any disclaimer, the term of this patent is extended or adjusted under 35 U.S.C. 154(b) by 250 days.

(21) Appl. No.: 15/115,128

(22) PCT Filed: Feb. 18, 2015

(86) PCT No.: PCT/JP2015/054458
§ 371 (c)(1),
(2) Date: Jul. 28, 2016

(87) PCT Pub. No.: WO2015/151619
PCT Pub. Date: Oct. 8, 2015

(65) Prior Publication Data
US 2017/0010766 A1     Jan. 12, 2017

(30) Foreign Application Priority Data
Apr. 3, 2014    (JP) ................................ 2014-076880

(51) Int. Cl.
*G06F 3/048*     (2013.01)
*G06F 3/0482*    (2013.01)
(Continued)

(52) U.S. Cl.
CPC ........... *G06F 3/0482* (2013.01); *B60K 35/00* (2013.01); *B60K 37/06* (2013.01);
(Continued)

(58) Field of Classification Search
CPC ............... G06F 3/0416; G06F 3/03547; G06F 3/04817; G06F 3/0482; G06F 3/04886;
(Continued)

(56) References Cited

U.S. PATENT DOCUMENTS 7,017,118 B1*   3/2006   Carroll ................. G06F 3/0481
                                             345/160
2004/0033829 A1*   2/2004   Pacey ................. G07F 17/3265
                                             463/20
(Continued)

FOREIGN PATENT DOCUMENTS

CN          1841293 A     10/2006
CN       101809531 A     8/2010
(Continued)

OTHER PUBLICATIONS

International Search Report issued for corresponding PCT/JP2015/054458 application.
(Continued)

*Primary Examiner* — Phuong H Nguyen
(74) *Attorney, Agent, or Firm* — IP Business Solutions, LLC

(57) ABSTRACT

A vehicle-mounted information device that does not create a cause of an erroneous operation is provided. In a vehicle-mounted information device capable of editing objects 11 to 18 displayed on a touch panel 121, an edit mode of displaying a mark 20 (20*a*) indicating a direction in which the object 11 is movable is provided, and by a touch operation onto the mark 20 (20*a*), the selected object 11 and an object 12 of interest which is located in the direction indicated by the mark 20 (20*a*) are interchanged.

5 Claims, 13 Drawing Sheets

(51) Int. Cl.
*G06F 3/0484* (2013.01)
*G01C 21/36* (2006.01)
*B60K 35/00* (2006.01)
*G06F 3/0488* (2013.01)
*B60K 37/06* (2006.01)
*G06F 3/0481* (2013.01)
*G06F 3/0486* (2013.01)

(52) U.S. Cl.
CPC ....... *G01C 21/3664* (2013.01); *G06F 3/0486* (2013.01); *G06F 3/0488* (2013.01); *G06F 3/04817* (2013.01); *G06F 3/04842* (2013.01); *G06F 3/04883* (2013.01); *B60K 2370/11* (2019.05); *B60K 2370/1442* (2019.05); *B60K 2370/1464* (2019.05); *G06F 2203/04803* (2013.01)

(58) Field of Classification Search
CPC ... G06F 2203/0339; G06F 2203/04808; G06F 3/0484; G06F 3/04812; G06F 3/017
See application file for complete search history.

(56) References Cited

U.S. PATENT DOCUMENTS

| | | | |
|---|---|---|---|
| 2004/0039523 A1* | 2/2004 | Kainuma | G01C 21/367 701/459 |
| 2006/0212829 A1 | 9/2006 | Yahiro et al. | |
| 2007/0035513 A1 | 2/2007 | Sherrard et al. | |
| 2007/0157089 A1 | 7/2007 | Van Os et al. | |
| 2007/0192749 A1 | 8/2007 | Baudisch | |
| 2008/0034317 A1 | 2/2008 | Fard et al. | |
| 2009/0138827 A1 | 5/2009 | Van Os et al. | |
| 2010/0205563 A1 | 8/2010 | Haapsaari et al. | |
| 2010/0275150 A1 | 10/2010 | Chiba et al. | |
| 2010/0295789 A1 | 11/2010 | Shin et al. | |
| 2011/0037720 A1 | 2/2011 | Hirukawa et al. | |
| 2011/0167389 A1 | 7/2011 | Murakami et al. | |
| 2012/0304084 A1 | 11/2012 | Kim et al. | |
| 2013/0201222 A1* | 8/2013 | Doyle | G16H 40/63 345/672 |
| 2013/0254708 A1* | 9/2013 | Dorcey | H04L 51/04 715/788 |
| 2013/0321340 A1* | 12/2013 | Seo | G06F 1/1641 345/174 |
| 2015/0149837 A1* | 5/2015 | Alonso | G06K 7/10227 714/57 |
| 2015/0242092 A1 | 8/2015 | Van Os et al. | |

FOREIGN PATENT DOCUMENTS

| | | |
|---|---|---|
| CN | 102016779 A | 4/2011 |
| CN | 103562832 A | 2/2014 |
| JP | 2009-522666 A | 6/2009 |
| JP | 2011-164923 A | 8/2011 |
| JP | 2013-200680 A | 10/2013 |
| WO | 2008/086471 A1 | 7/2008 |

OTHER PUBLICATIONS

Written Opinion of the International Search Authority issued for corresponding PCT/JP2015/054458 application.
Extended European Search Report mailed by European Patent Office dated Nov. 2, 2017 in the corresponding European patent application No. 15773100.1-1879.
International Preliminary Report on Patentability issued for corresponding PCT/JP2015/054458 application.
Notice of Reasons for Refusal mailed by Japan Patent Office dated Jun. 6 2017 in the corresponding Japanese patent application No. 2016-511438.
Notice of Reasons for Refusal mailed by China Patent Office dated Aug. 22, 2017 in the corresponding Chinese patent application No. 201580012873.7.
Chinese Office Action mailed by Chinese Patent Office dated Apr. 25, 2018 in the corresponding Chinese patent application No. 201580012873.7.
Notice of Reasons for Refusal mailed by the European Patent Office dated Sep. 14, 2018 in corresponding European patent Application No. 15773100.0-1221.

* cited by examiner

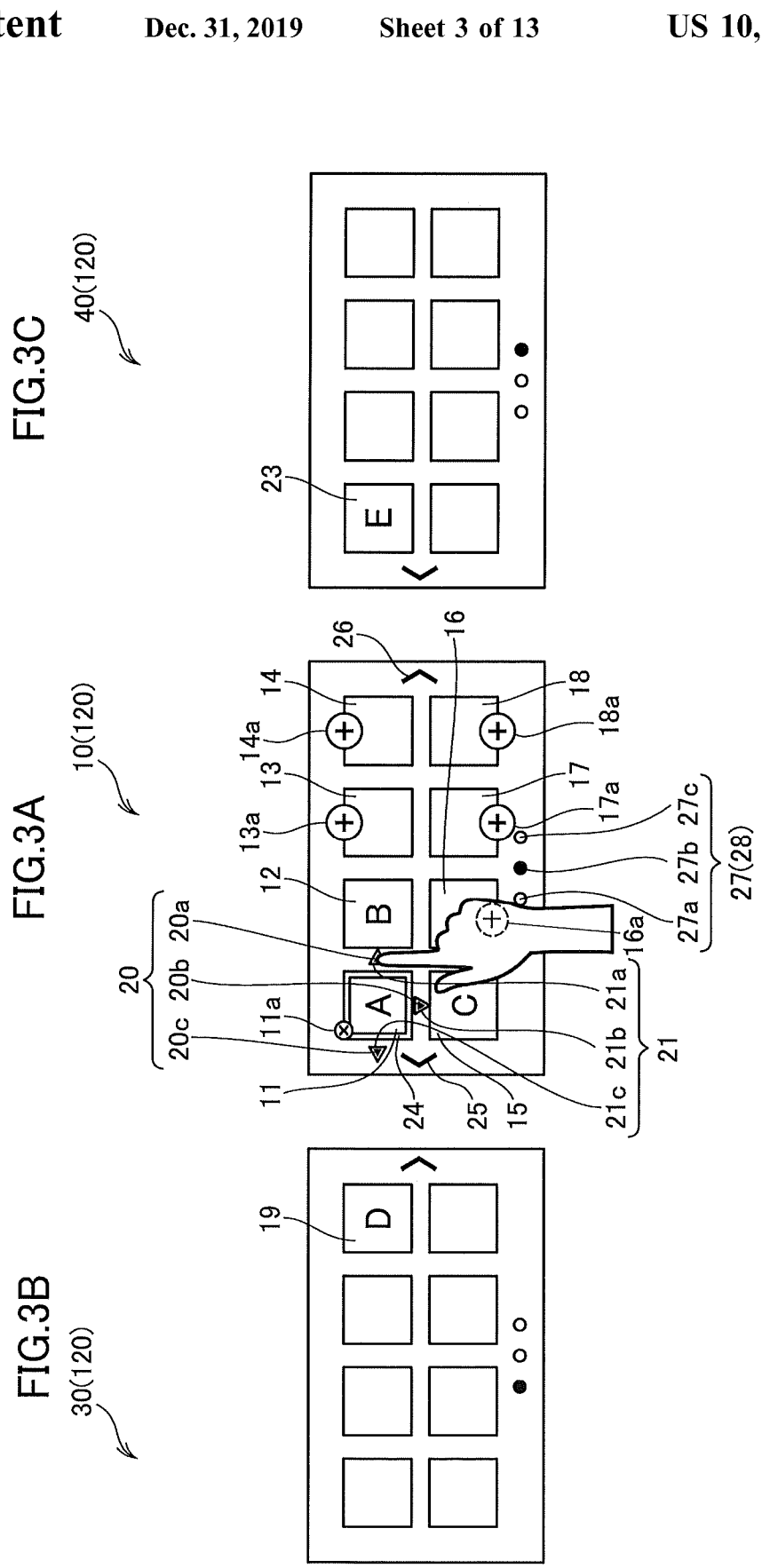

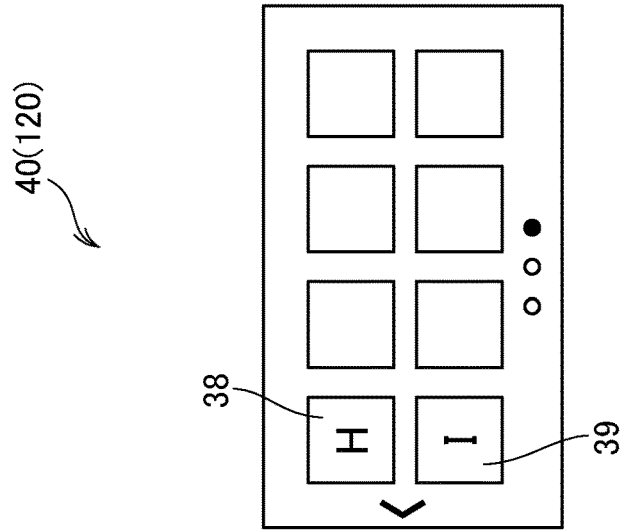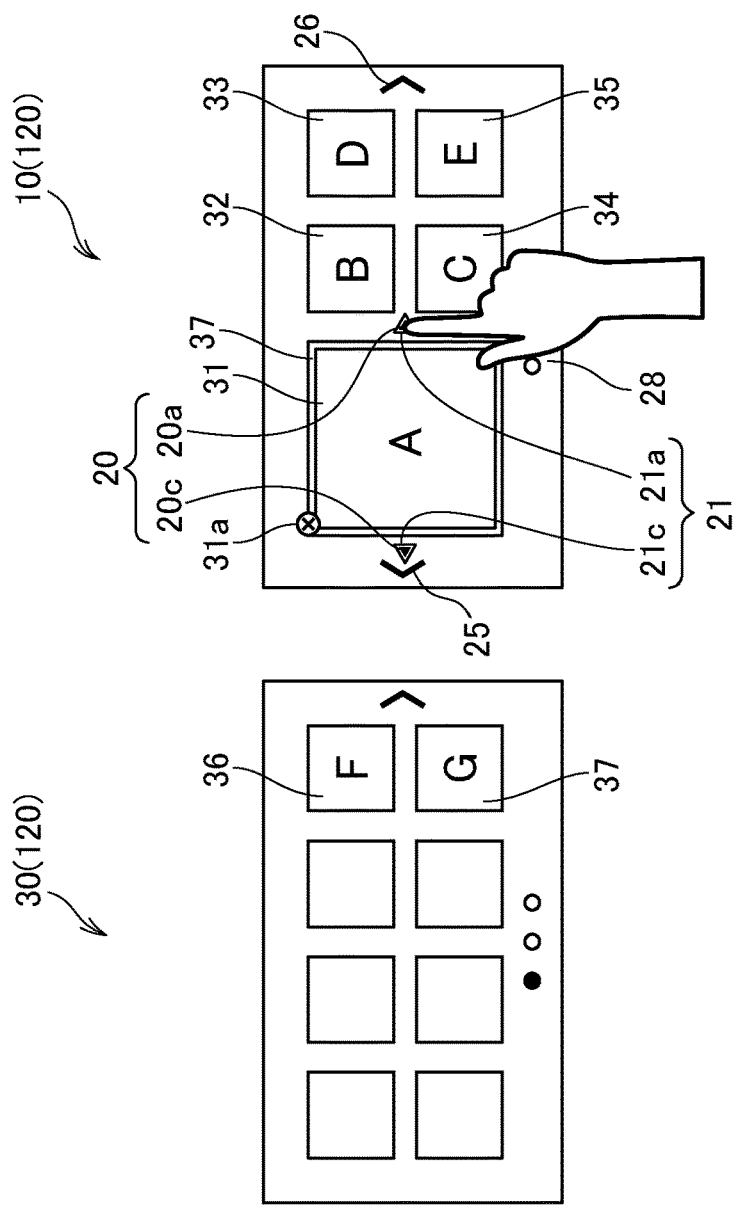

VEHICLE-MOUNTED INFORMATION DEVICE

TECHNICAL FIELD

The present invention relates to a vehicle-mounted information device including a touch panel.

BACKGROUND ART

Conventionally, in each of many touch panel devices such as smartphones and tablet personal computers, at the time of rearranging icons in an edit screen, shift and switching of an object have been performed by bringing about an edit state by holding down (keeping) the object (pressed down), and thereafter, dragging the object (refer to Patent Literature 1, for example).

CITATION LIST

Patent Literature

Patent Literature 1: Japanese Patent Laid-Open No. 2009-522666

SUMMARY OF INVENTION

Technical Problem

However, in the case according to Patent Literature 1, a drag operation that operates a touch panel device without moving one's finger from a display screen is difficult in a vehicle-mounted device which is used when a user has his or her body fixed by a seatbelt and swing or the like at the time of driving affects the operation, although there is no problem in the case of a tough panel device which is operable by being held by a hand. Consequently, there has been the problem of a finger moving from a display screen unintentionally during an operation, which becomes a cause of an erroneous operation. Further, there has been the problem that when a touch panel is operated during stopping at a red light, the operation is stopped when the signal changes during the operation, as a result of which, an unintentional operation is performed.

The present invention is made in the light of the circumferences mentioned above, and has an object to provide a vehicle-mounted information device that does not create a cause of an erroneous operation.

Solution to Problem

In order to achieve the above described object, the present invention is a vehicle-mounted information device capable of editing an object displayed on a touch panel, wherein an edit mode of displaying a mark indicating a direction in which the object is movable is provided, and by a touch operation onto the mark, a selected object and an object of interest which is located in the direction indicated by the mark are interchanged.

Since in this invention, the selected object and the object of interest which is located in the direction indicated by the mark are interchanged by the touch operation onto the mark, the editing operation can be reliably performed, and a malfunction is restrained.

By the touch operation onto the mark, the selected object, and one or a group of the objects of interest having a display form substantially equal to the selected object may be interchanged.

When a height of a display region of the entire group of the icons of interest is within a height of a display region of the selected object, and widths of individual display regions of the group of the icons of interest are within a width of a display region of a largest icon of interest, the selected object and the group of the objects of interest may be interchanged.

When a width of the display region of the entire group of the icons of interest is within a width of the display region of the selected object, and heights of the individual display regions of the group of the icons of interest are within a height H of the display region of the largest icon of interest, the selected object and the group of the objects of interest may be interchanged.

By keeping the mark pressed down, the one or the group of the objects of interest that may be interchanged is or are displayed to be recognizable.

A delete section may be displayed in the selected object, or an addition section is displayed in the selected object.

Advantageous Effect Of Invention

According to the present invention, interchange of the objects is enabled without needing a drag operation, so that even in the situation where swing occurs at the time of driving, for example, the event where a mistake is made in the drag operation does not occur, and an erroneous operation of the touch panel can be prevented.

BRIEF DESCRIPTION OF THE DRAWINGS

FIG. 3A shows a first edit screen of an edit mode, FIG. 3B shows a second edit screen, and FIG. 3C shows a third edit screen.

FIGS. 5A to 5C are diagrams according to another embodiment, FIG. 5A shows a first edit screen of an edit mode, FIG. 5B shows a second edit screen, and FIG. 5C shows a third edit screen.

DESCRIPTION OF EMBODIMENT

Hereinafter, one embodiment of the present invention will be described with reference to the drawings.

Figure 1:
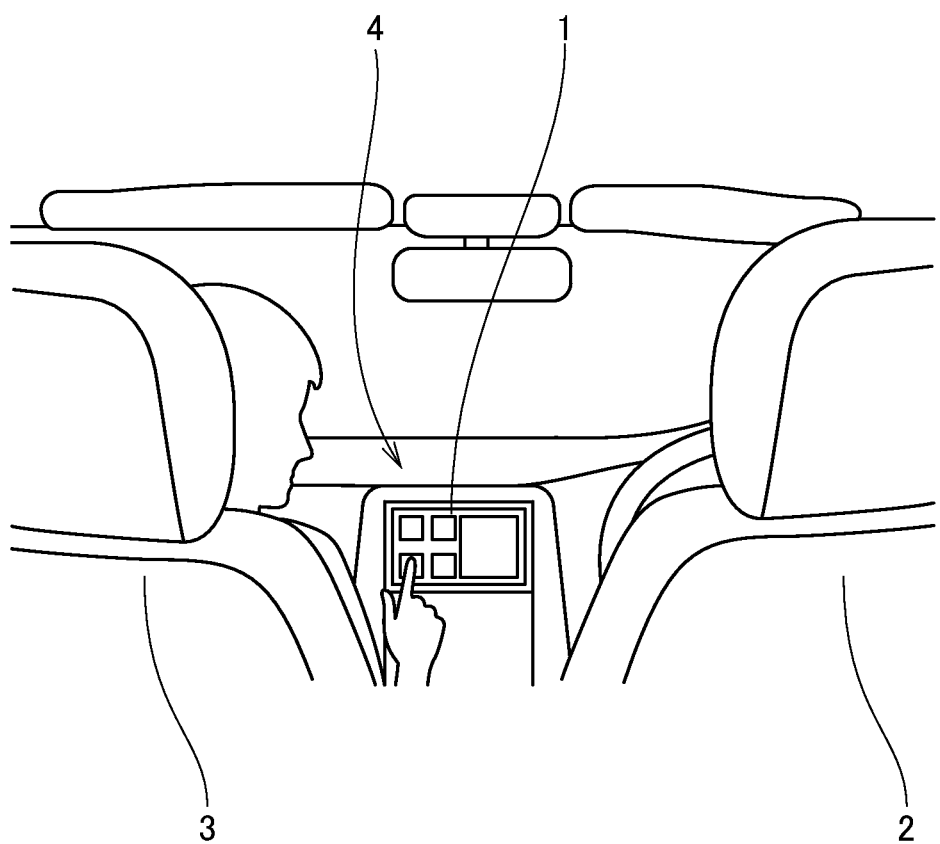
FIG. 1 is a diagram showing a car navigation device according to an embodiment of the present invention.

In FIG. 1, reference sign 1 denotes a car navigation device (a vehicle-mounted information device) according to the present embodiment. The car navigation device 1 is mounted on a front section 4 in an in-vehicle space between a driver's seat 2 and a passenger seat 3, for example.

Figure 2:
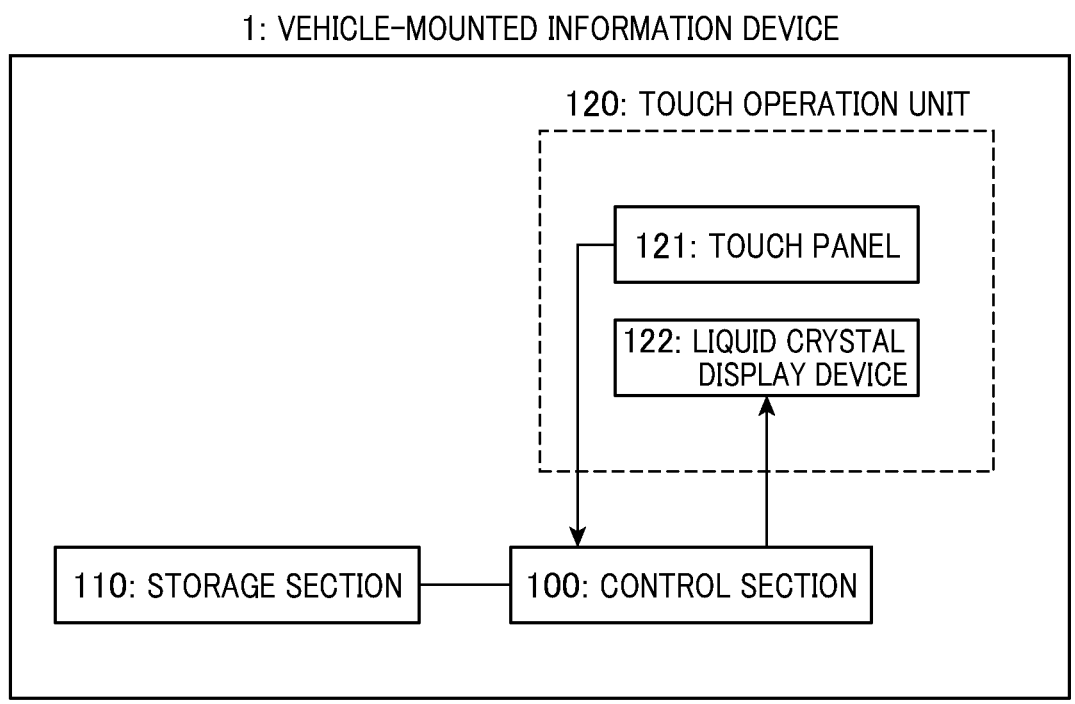
FIG. 2 is a block diagram showing an example of a hardware configuration.

FIG. 2 is a functional block diagram of the car navigation device 1 according to the present embodiment.

The car navigation device 1 includes a control section 100, a storage section 110 and a touch operation unit 120.

The control section 100 controls a whole of the car navigation device 1, and includes an arithmetic unit such as a CPU that realizes respective functions by executing various programs.

The storage section 110 is a nonvolatile memory capable of electrical rewriting such as a flash memory, for example, and stores programs for realizing respective functions such as a navigation function and an audio function, for example. Further, the storage section 110 also stores image data for GUI (graphical user interface) of items to be displayed on a screen of a liquid crystal display device 122 which will be described later.

The touch operation unit 120 includes a touch panel 121 and the liquid crystal display device 122, and the liquid crystal display device 122 is provided under the touch panel 121. The touch operation unit 120 displays various kinds of information in the liquid crystal display device 122 so that a user can intuitively operate the information, and receives a touch operation of the user so as to be able to operate the information displayed by the touch panel 121.

The touch panel 121 receives an operation of the user so as to operate the car navigation device 1. The touch panel 121 outputs the received operation information to the control section 100, and the control section 100 reads a program from the storage section 110 on the basis of the acquired operation information, and executes the program, whereby the car navigation device 1 executes an operation. More specifically, the touch panel 121 detects a touch position which the user touches, and outputs the touch position to the control section 100. The control section 100 identifies information designated by the user on the basis of the acquired touch position, reads a program associated with the information from the storage section 110, and executes the program. Thereby, the car navigation device 1 can execute the operation.

Detection methods of a touch operation of the touch panel 121 include various methods such as a capacitance method, a resistance film method and an ultrasonic method, and any method may be adopted as long as the method detects a touch operation of the user.

The liquid crystal display device 122 is a thin planar visual display unit such as a liquid crystal display, and displays various kinds of information on a screen on the basis of a display screen signal that is outputted from the control section 100 under control of the control section 100.

FIGS. 3A to 3C are diagrams showing a process of operating the car navigation device 1 in an edit mode.

When the user gives a shift instruction to the edit mode from the touch panel 121 of the touch operation unit 120 in the present embodiment, a first edit screen 10 is displayed in the liquid crystal display device 122 via the control section 100, as shown in FIG. 3A. On the first edit screen 10, eight icons 11, 12, 13, . . . , 18 in total are disposed laterally in four columns and vertically in two rows. When the first edit screen 10 is opened, the icon 11 on an upper left of the edit screen 10 is selected to be editable as an initial state.

In FIG. 3A, an application A is set to the icon 11, an application B is set to the icon 12, an application C is set to the icon 15, an application D is set to an icon 19, and an application E is set to an icon 23. In the first edit screen 10, a delete section 11a for deleting the application is displayed on an upper left of the icon 11. Note that the respective applications such as the application A, the application B, the application C, . . . , and the like are, for example, a music application, a map application and the like.

The icons 13, 14, 16, 17 and 18 are blank icons. Applications are not set to the blank icons 13, 14, 16, 17 and 18. Addition sections 13a, 14a, 16a, 17a and 18a for adding applications are displayed. Here, the term icon refers to a displayed matter of a small size in the first edit screen 10, for example. A term widget refers to a displayed matter of a large size in the first edit screen, for example. As a general term including the icon and the widget, a term object is used.

In FIG. 3A, the icon 11 on the upper left is selected to be editable.

In the selected icon (selected object) 11, a perimeter frame 24 thereof is caused to develop a color to be visually understandable.

Mark (shift marks) 20 (20a, 20b, 20c) indicating directions in which an object is movable are displayed on a perimeter of the perimeter frame 24. When the icon (object) is selected, the shift marks 20 are displayed on a perimeter of the selected icon when there is a destination to which the selected icon can be shifted potentially. Referring to FIG. 3A, for example, the icon 11 is structured to be unable to move to an upper side of the icon 11, so that the icon 11 is unable to shift to the upper side from the icon 11 potentially, and the shift mark 20 is not displayed at the upper side of the icon 11. On the other hand, the icon 11 is structured to be movable to a left and a right and a lower side, and therefore, the shift marks 20 (20a, 20b, 20c) are displayed at the left and the right, and the lower side of the icon 11.

In the shift marks 20 (20a, 20b, 20c), frame sections 21 (21a, 21b, 21c) develop a color so as to be visually understandable, similarly to the perimeter frame 24. In relation of the selected icon (object) and an icon (object) of interest, the frame sections 21 of the shift marks 20 are caused to develop a color to be visually understandable, when the selected icon is actually interchangeable with the icon of interest. Referring to FIG. 3A, for example, the icon 11 and the icon 12 are the same in width and height, and these icons are interchangeable, and therefore, the frame section 21a of the shift mark 20a which is displayed at a right side of the icon 11 is caused to develop a color to be visually understandable.

At a left and right ends of the first edit screen 10, slide sections 25 and 26 are displayed. If the slide section 25 at the left end is touched, the first edit screen 10 is switched to a second edit screen 30 shown in FIG. 3B, and if the slide section 26 at the right end is touched, the first edit screen 10 is switched to a third edit screen 40 shown in FIG. 3C.

A position display section 28 including three screen position displays 27 (27a, 27b, 27c) is provided at a lower portion of a center of the first edit screen 10. A number of screen position displays 27 is equal to a number of edit screens, and a position of the screen which is displayed at present is displayed by causing any one of the screen position displays 27a, 27b and 27c to develop a color.

Next, switching of the object arrangement position will be described.

Figure 4A:
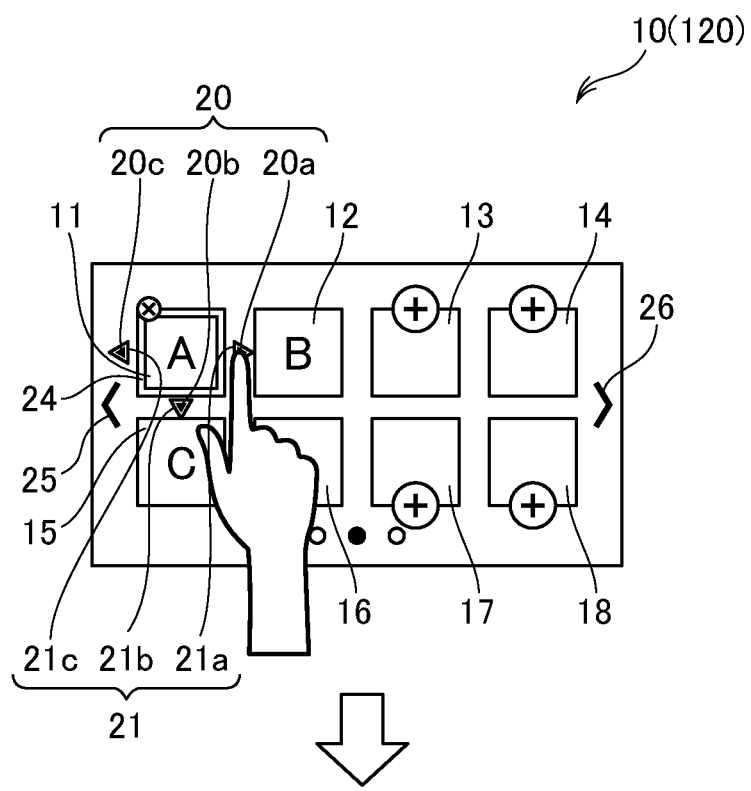
FIGS. 4A and 4B are diagrams showing an interchange operation of objects and are diagrams each showing the first edit screen.

Referring to FIG. 4A, the shift marks 20 (20a, 20b, 20c) that show directions to which the selected icon 11 is movable are displayed on the perimeter of the selected icon 11. The frame sections 21 (21a, 21b, 21c) of the shift marks 20 (20a, 20b, 20c) develop a color.

Figure 4B:
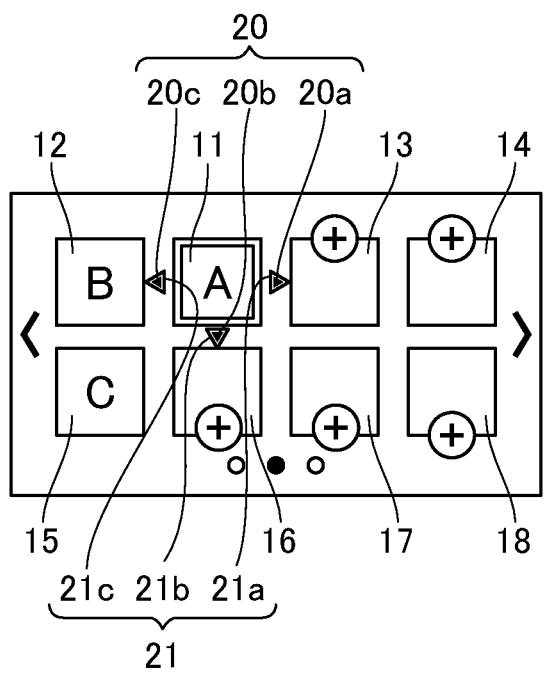

When the user touches the shift mark 20*a* in the present embodiment, the selected icon 11 and the icon 12 of interest which is located in the direction indicated by the shift mark 20*a* are displayed with display positions thereof being interchanged, as shown in FIG. 4B.

When the shift mark 20*b* is touched, the selected icon 11 and the icon 15 of interest which is located at a lower side are displayed with display positions thereof being interchanged, though not illustrated. When the shift mark 20*c* is touched, the selected icon 11 and an icon of interest which is located at a left side of the selected icon 11 are displayed with display positions thereof interchanged. However, the icon of interest which is located at the left side is not present in FIG. 4A, and in this case, the selected icon 11 and the icon 19 of interest in the second edit screen 30 shown in FIG. 3B are displayed with display positions thereof being interchanged. That is, in FIG. 4, the single selected icon 11 and the single icon 12 of interest having a display form substantially equal to the selected icon 11 are displayed with the display positions thereof being interchanged.

In FIG. 4B, the shift marks 20 which indicate the directions in which the selected icon 11 is movable are displayed on the perimeter of the selected icon 11, as described above. In this case, the frame sections 21 of the shift marks 20 develop a color. When the selected icon 11 is further moved downward, for example, in FIG. 4B, a touch operation is applied to the shift mark 20*b*.

Thereupon, the selected icon 11 and the icon 16 of interest which is present in the position indicated by the shift mark 20*b* are interchanged and displayed, though not illustrated. In this configuration, the shift marks 20 are displayed in the destination of the selected icon 11, and therefore, the selected icon 11 can be interchanged with the adjacent icon of interest successively.

When the icon desired to be selected is not the icon 11 but the icon 12, for example, in the first edit screen 10, the icon 12 is touched.

Thereupon, the icon 12 is selected, and the shift marks 20 are displayed on a perimeter of the selected icon 12, though not illustrated. When the shift mark 20 indicating the moving direction is touched to designate the destination of the selected icon 12 as in the above described embodiment, the selected icon 12 is interchanged with an icon of interest in the destination, and is displayed.

FIGS. 5A to 5C show another embodiment.

FIGS. 5A to 5C are diagrams showing how switching of an arrangement position of a widget which is larger than the icon is performed in the edit screen 10, for example.

In the first edit screen 10, a widget 31 is arranged in a left half and icons 32, 33, 34 and 35 are arranged in a right half, as FIG. 5A is referred to.

The application A is set to the widget 31, the application B is set to the icon 32, the application D is set to the icon 33, the application C is set to the icon 34, and the application E is set to the icon 35, respectively.

In FIG. 5A, the widget 31 is selected to be editable. A delete section 31*a* for deleting the application A which is set to the widget 31 is displayed at an upper left of the selected widget 31. A perimeter frame 37 of the selected widget 31 is clearly shown by developing a color to be visually understandable. At outer sides of a left and a right of the perimeter frame 37, shift marks 20 (20*a*, 20*c*) are displayed. In the shift marks 20 (20*a*, 20*c*), the frame sections 21 (21*a*, 21*c*) are also clearly shown by developing a color so as to be visually understandable similarly to the perimeter frame 37. Further, at a left end of the first edit screen 10, a slide section 25 that switches the screen to the second edit screen 30 shown in FIG. 5B is displayed, and at a right end of the edit screen 10, a slide section 26 that switches the screen to the third edit screen 40 shown in FIG. 5C is displayed. A position display section 28 is displayed at a lower portion of the first edit screen 10. An application H is set to the icon 38, and an application I is set to the icon 39.

Figure 6A:
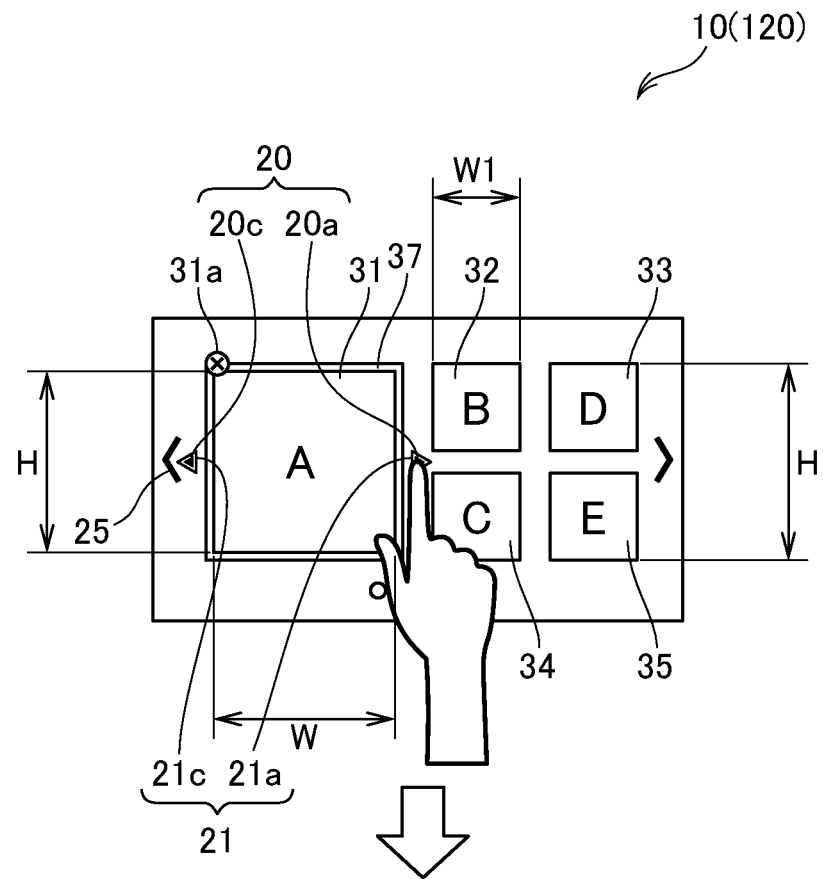
FIGS. 6A and 6B are diagrams showing an interchange operation of objects according to another embodiment and are diagrams each showing a first edit screen.

FIG. 6A shows the first edit screen 10 corresponding to FIG. 5A.

The shift marks 20 (20*a*, 20*c*) are displayed at the outer sides of the left and right of the selected widget 31. When the shift mark 20*a* is touched, the selected widget 31 and a group of icons 32 and 34 of interest which are located in the direction indicated by the shift mark 20*b* are interchanged and displayed.

The group of the icons 32 and 34 of interest are arranged in such a manner that a height H of the group of the icons 32 and 34 of interest is equal to a height H of the selected widget 31, and widths W1 of the group of the icons 32 and 34 of interest are equal to each other. In this case, a display form of the selected widget 31 and a display form of the group of the icons 32 and 34 of interest are regarded as substantially equal, and the selected widget 31 and the group of the icons 32 and 34 of interest are interchanged.

In more detail, when the height H of a display region of the entire group of the icons 32 and 34 of interest is within the height H of the display region of the selected object 31, and the widths of display regions of the individual icons 32 and 34 of the group of the icons 32 and 34 of interest are within the width of the display region of the icon 32 or 34 of interest which has the largest width of the group of the icons 32 and 34 of interest (In this case, the widths of the icons 32 and 34 of interest are equal.), the selected object 31 and the group of the objects 32 and 34 of interest become interchangeable.

It is needless to say that a width W of a display region of the entire group of the icons 32 and 34 of interest is within the width W of the display region of the selected object 31.

Further, when the shift mark 20*c* is touched, the selected widget 31 and the group of the icons 36 and 37 of interest in the second edit screen 30 shown in FIG. 5B are displayed with display positions thereof being interchanged, though not illustrated.

Figure 6B:
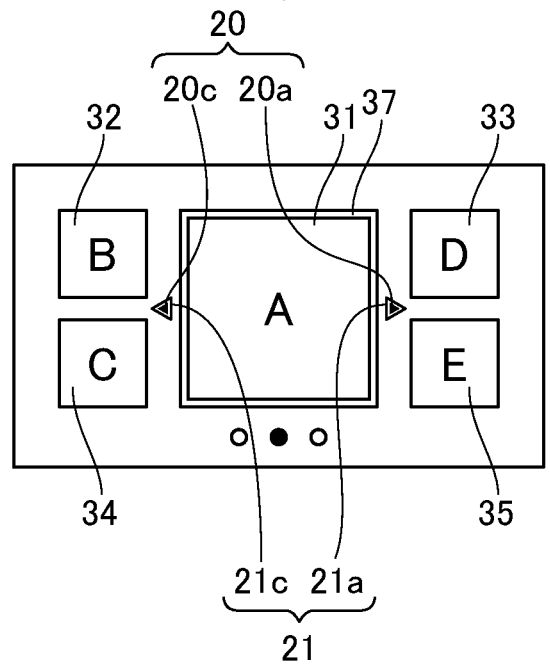

In FIG. 6B, the shift marks 20 indicating the directions in which the selected widget 31 is movable are displayed on a perimeter of the selected widget 31, as described above, and the frame sections 21 of the shift marks 20 develop a color. Here, when the widget 31 is moved in a right direction, for example, a touch operation of the shift mark 20*a* is performed. Thereupon, the selected widget 31 and the group of the icons 33 and 35 of interest are displayed by being interchanged, though not illustrated.

Figure 7A:
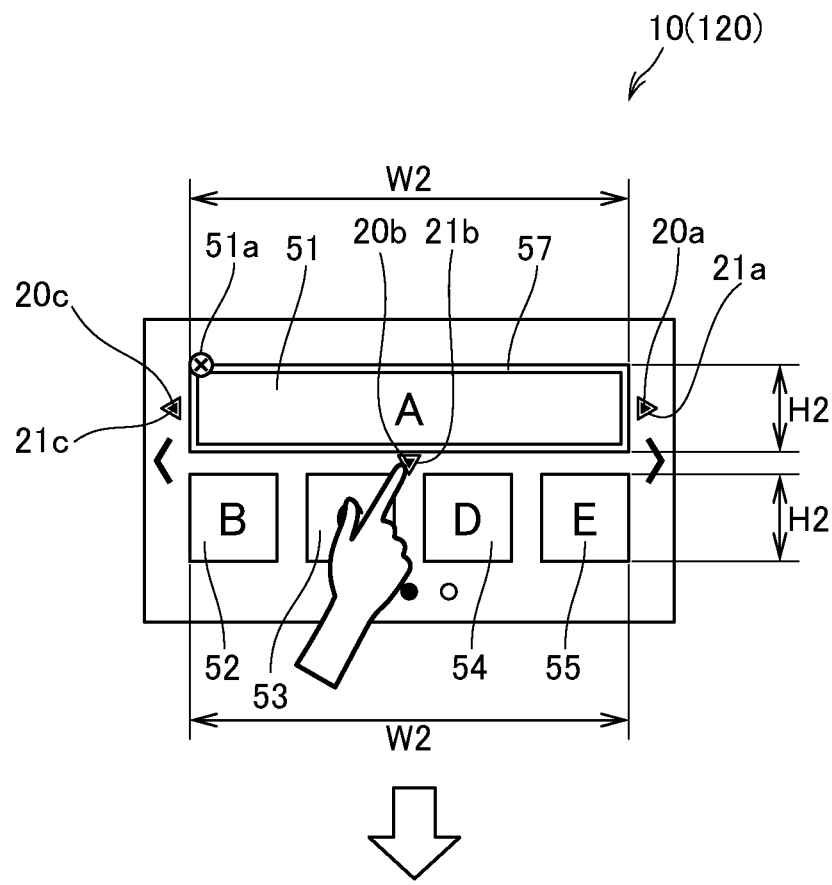
FIGS. 7A and 7B are diagrams showing an interchange operation of objects according to another embodiment and are diagrams each showing a first edit screen.
Figure 7B:
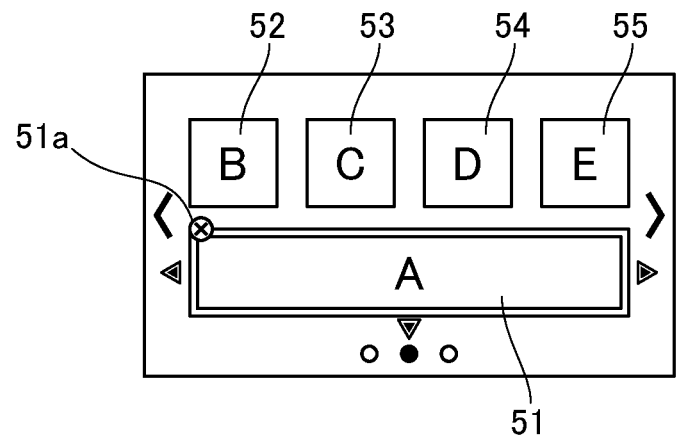

FIGS. 7A and 7B show another embodiment.

In FIGS. 7A and 7B, in the first edit screen 10, a widget 51 is arranged in an upper half of the screen, and icons 52, 53, 54 and 55 are arranged in a lower half.

The application A is set to the widget 51, the application B is set to the icon 52, the application C is set to the icon 53, the application D is set to the icon 54, and the application E is set to the icon 55, respectively.

In FIG. 7A, the widget 51 is selected. A delete section 51*a* for deleting the application A which is set to the widget 51 is displayed at an upper left of the selected widget 51. A perimeter frame 57 of the selected widget 51 is clearly displayed by developing a color to be visually understandable. At outer sides of a left and a right and at a lower side of the perimeter frame 57, shift marks 20 (20*a*, 20*b*, 20*c*) are displayed. In the shift marks 20 (20*a*, 20*b*, 20*c*), frame sections 21 (21a, 21b, 21c) are also clearly shown by developing a color so as to be visually understandable similarly to the perimeter frame 57. In FIG. 7A, the group of the icons 52 to 55 of interest are arranged in such a manner that a width W2 of a whole of the group of the icons 52 to 55 of interest is equal to a width W2 of the selected widget 51, and individual heights H2 of the group of the icons 52 to 55 of interest are equal to one another. In this case, if a touch operation of the shift mark 20b is performed, for example, a display form of the selected widget 51 and a display form of the group of the icons 52 to 55 of interest are regarded as substantially equal, and the selected widget 51 and the group of the icons 52 to 55 of interest are interchanged.

In more detail, when the width W2 of a display region of the entire group of the icons 52 to 55 of interest is within the width W2 of the display region of the selected object 51, and the heights H2 of display regions of the individual icons 52 to 55 of the group of the icons 52 to 55 of interest are within the height of the display region of any of the icon 52 to 55 of interest which has the largest height of the group of the icons 52 to 55 (In this case, the heights of the icons 52 to 55 of interest are equal.), the selected object and the group of the objects of interest may be interchanged.

It is needless to say that a height H2 of the display region of the entire group of the icons 52 to 55 of interest is within the height H2 of the display region of the selected object 51.

Figure 8A:
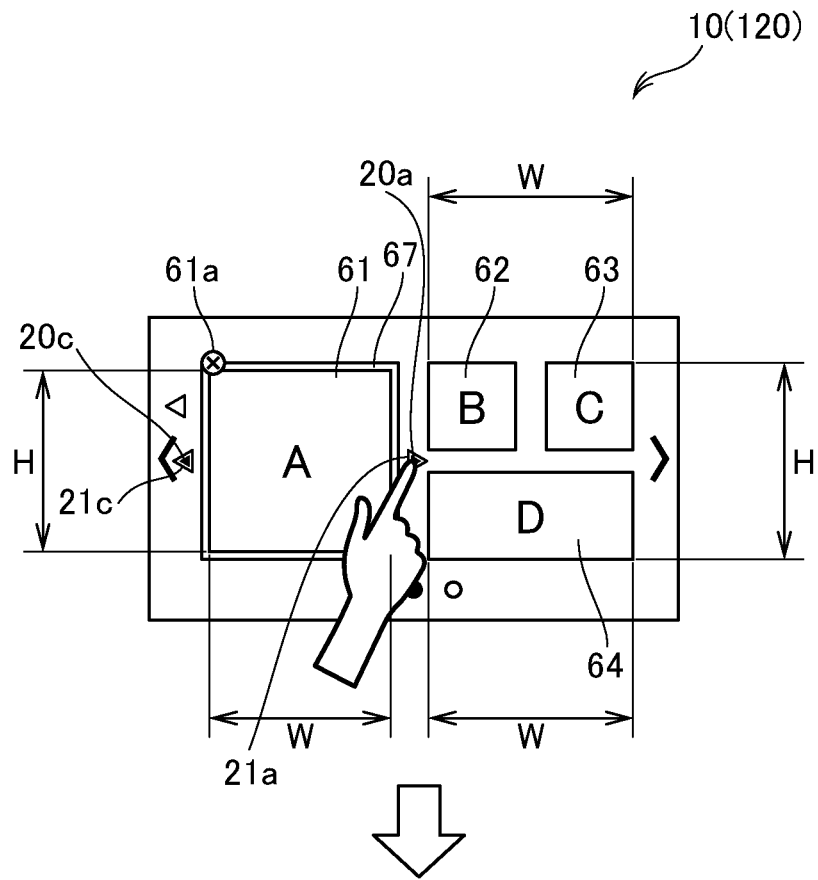
FIGS. 8A and 8B are diagrams showing an interchange operation of objects according to another embodiment and are diagrams each showing a first edit screen.
Figure 8B:
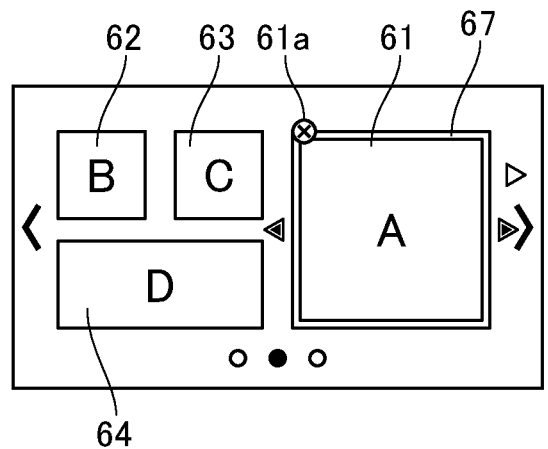

In FIGS. 8A and 8B, in the first edit screen 10, a widget 61 is arranged in a left half of the screen, icons 62 and 63 are arranged at an upper side of a right half, and a widget 64 is arranged at a lower side of the right half.

The application A is set to the widget 61, the application B is set to the icon 62, the application C is set to the icon 63, and the application D is set to the icon 64, respectively.

In FIG. 8A, the widget 61 is selected. A delete section 61a for deleting the application A which is set to the widget 61 is displayed at an upper left of the selected widget 61. In the shift marks 20 (20a, 20c), frame sections 21 (21a, 21c) are clearly shown by developing a color to be visually understandable, similarly to a perimeter frame 67. In FIG. 8A, a group of the icons 62 to 64 of interest are arranged in such a manner that a height H is equal to a height H of the selected widget 61, a width W of the group of the icons 62 to 64 of interest is within a width W of the icon 64 of interest, and is equal to a width W of the selected widget 61.

In this case, if a touch operation of the shift mark 20a is performed, for example, a display form of the selected widget 61 and a display form of the group of the icons 62 to 64 of interest are regarded as substantially equal, and the selected widget 61 and the group of the icons 62 to 64 of interest are interchanged, as shown in FIG. 8B.

In more detail, when the height H of a display region of the entire group of the icons 62 to 64 of interest is within the height H of the display region of the selected object 61, and the widths of display regions of the individual objects 62 to 64 of the group of the objects 62 to 64 of interest, are within the width of the display region of the widget 64 of interest which has the largest width of the group of the objects 62 to 64 of interest, the selected object 61 and the group of the objects 62 to 64 of interest become interchangeable.

Figure 9:
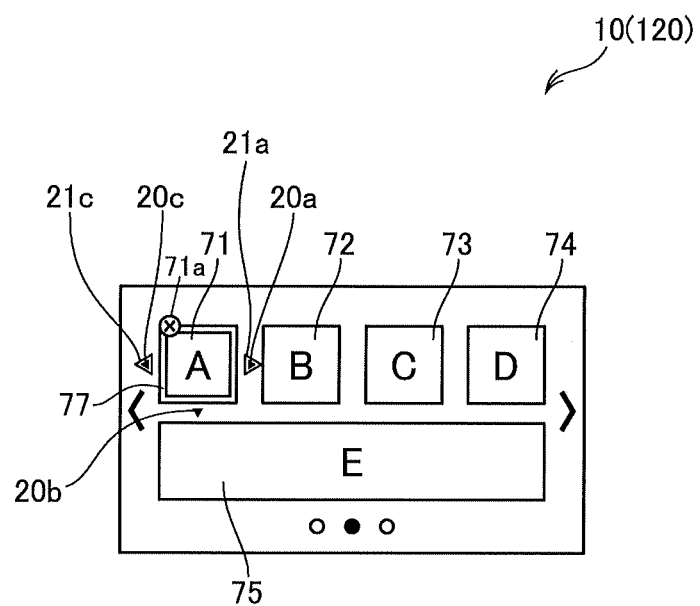
FIG. 9 is a diagram showing a state in which an interchange operation of objects is impossible, according to another embodiment.

In FIG. 9, in the first edit screen 10, icons 71, 72, 73 and 74 are arranged at an upper half of the screen, and a widget 75 is arranged at a lower half of the screen.

The application A is set to the icon 71, the application B is set to the icon 72, the application C is set to the icon 73, the application D is set to the icon 74, and the application E is set to the widget 75, respectively.

In FIG. 9, the icon 71 is selected. When the icon 71 is selected, a delete section 71a for deleting the application A which is set to the icon 71 is displayed at an upper left of the icon 71. When the icon 71 is selected, a perimeter frame 77 of the icon 71 is clearly shown to be visually understandable. At outer sides of both a left and right ends of the perimeter frame 77, shift marks 20 (20a, 20b, 20c) are displayed.

The icon 71 can be interchanged with the icon 72 by touching the shift mark 20a. Further, the icon 71 can be interchanged with an icon not illustrated, which is present in an edit screen adjacent to the edit screen 10 by touching the shift mark 20c. Consequently, in 20a and 20c of the shift marks 20, frame sections 21 (21a, 21c) are caused to develop a color so as to be visually understandable, similarly to the perimeter frame 77.

On the other hand, even if the shift mark 20b is touched, the icon 71 cannot be interchanged with the widget 75. Consequently, the frame section 21b is not caused to develop a color to be visually understandable.

Next, with reference to FIGS. 10A and 10B, an application addition operation will be described.

Figure 10A:
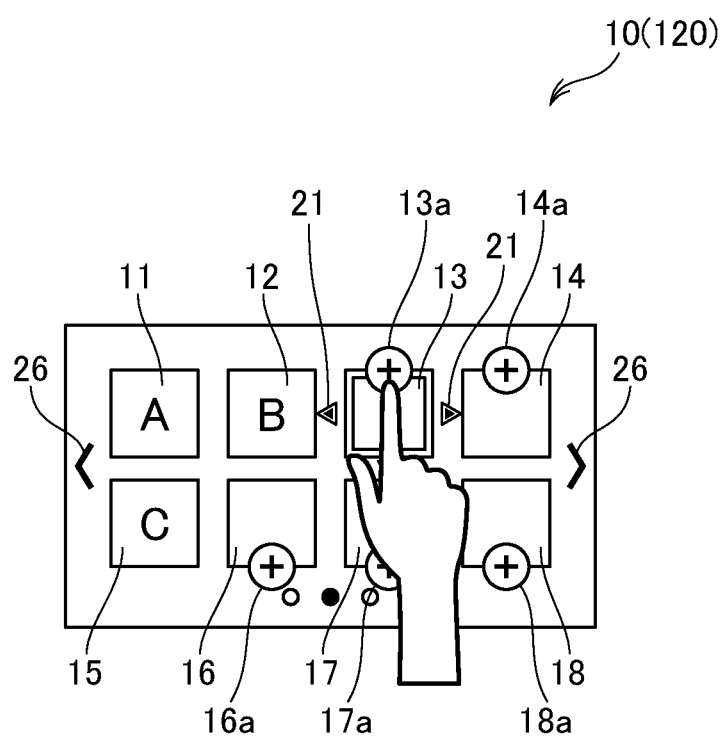
FIG. 10A shows an edit screen.

The first edit screen 10 shown in FIG. 10A includes an arrangement configuration similar to that in FIG. 3A. Although not illustrated in FIGS. 10A and 10B, at a left and a right of the first edit screen 10, the second and third edit screens 30 and 40 similar to those in FIG. 3B and FIG. 3C are present. In FIG. 10A, no application is set to icons 13, 14, 16, 17, and 18. Application addition sections 13a, 14a, 16a, 17a and 18a are displayed on the icons 13, 14, 16, 17 and 18.

Figure 10B:
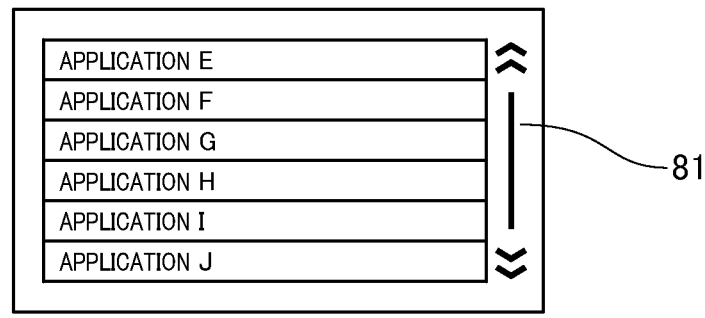
FIG. 10B shows an application selection screen.

FIG. 10B shows an application selection screen 80. On the application selection screen 80, applications E to J are displayed. A scroll section 81 is displayed at a right end of the application selection screen 80, and by an operation of the scroll section 81, for example, an application K, an application L, . . . not illustrated are displayed by being switched, on the application selection screen 80.

When the addition section 13a, for example, shown in FIG. 10A is touched in the application addition operation, the first edit screen 10 is changed to the application selection screen 80 shown in FIG. 10B. In the application selection screen 80, the scroll section 81 is slid up and down, whereby display of the applications is changed. When an optional application displayed in the application selection screen 80 is touched, the application is disposed into the blank icon 13 in FIG. 10A. When applications are additionally disposed into the blank icons 14 to 18, a similar operation is performed.

Note that in a case of deleting the application, the delete section 11a is displayed at the upper left of the selected icon 11, when FIG. 3A is referred to, for example. When the delete section 11a is touched, the application A which is set to the selected icon 11 is deleted from the selected icon 11. When the application A is deleted, the application A is displayed on the application selection screen 80 as referred to FIG. 10B.

Figure 11:
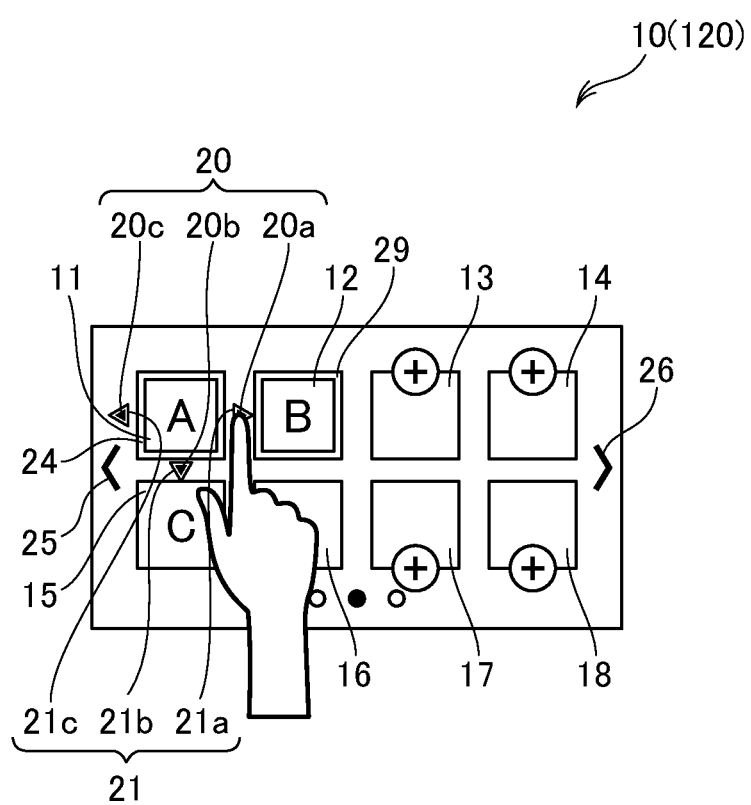
FIG. 11 is a diagram showing a first edit screen of an edit mode.

FIG. 11 shows another embodiment.

FIG. 11 includes a configuration similar to the configuration in FIG. 3A.

In the selected icon 11, the shift marks 20 (20a, 20b, 20c) are displayed. When the shift mark 20a is held down (is kept pressed down), for example, in the present embodiment, a perimeter frame of the object that can be interchanged with the selected icon 11, that is, a perimeter frame 29 of the icon 12 of interest is clearly shown by developing a color so as to be visually understandable.

In this configuration, after the shift mark 20a is kept pressed down, for example, and presence of the icon 12 of interest is recognized, a hand is moved off once, and by another touch operation onto the shift mark 20a, the selected icon 11 and the icon 12 of interest can be interchanged.

Figure 12:
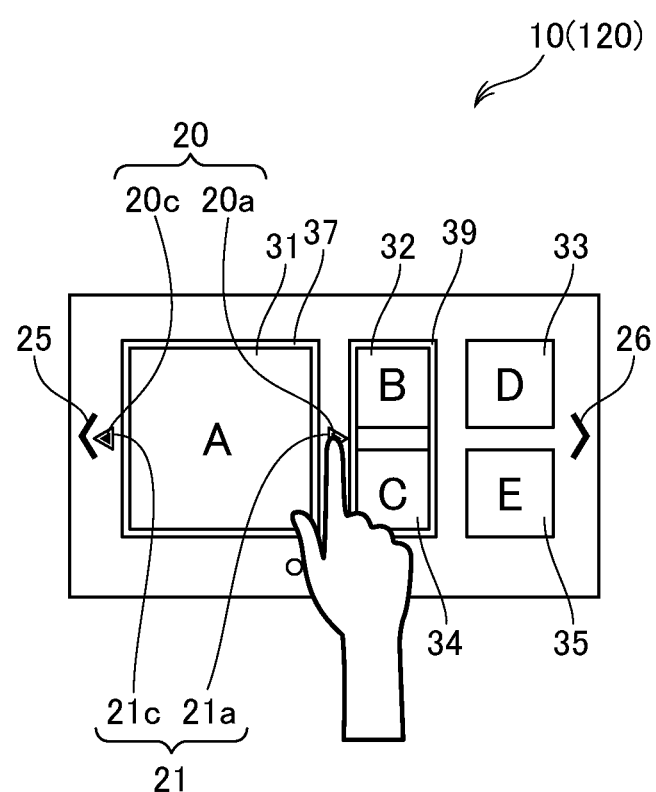
FIG. 12 is a diagram showing a first edit screen of an edit mode.

FIG. 12 shows another embodiment.

FIG. 12 includes a configuration similar to the configuration in FIG. 5A.

In the selected widget 31, the shift marks (20a, 20c) are displayed. In the present embodiment, the shift mark 20a is held down (is kept pressed down), for example, whereby a perimeter frame 39 of the group of the icons 32 and 34 of interest is clearly shown by developing a color so as to be visually understandable. In this configuration, after the shift mark 20a is kept pressed down, for example, and presence of the group of the icons 32 and 34 of interest is recognized, a hand is moved off once, and by another touch operation onto the shift mark 20a, the selected widget 31, and the group of the icons 32 and 34 of interest can be interchanged.

As described above, according to the present embodiment, the following effects are provided.

That is, according to the present embodiment, when a user gives a shift instruction to the edit mode from the touch panel 121 of the touch operation unit 120, the first edit screen 10 is displayed in the liquid crystal display device 122 via the control section 100, as shown in FIG. 3A, for example. Subsequently, by a touch operation onto a desired mark of the marks indicating the directions in which the object is movable, the selected object and the desired object of interest which is adjacent to the selected object can be interchanged.

Accordingly, a drag operation is not required as in the conventional art, and an operation can be performed by only touching the touch panel 121 once. Since switching is enabled by a touch operation onto the mark, an erroneous operation at the time of switching can be prevented even in a situation where a body is fixed by a seatbelt and a swing at the time of driving occurs in a vehicle, for example.

Further, according to the present embodiment, when an object is selected, the shift marks 20 are displayed in the perimeter of the selected object, when there is potentially a destination to which the selected object can be switched. In relation of the selected object and the object of interest, the frame sections 21 of the shift marks 20 are clearly shown so as to be visually understandable when the selected object and the object of interest are actually interchangeable.

Consequently, when the frame section 21 of the shift mark 20 is clearly shown so as to be visually understandable, it can be determined in a short time that the selected object can be interchanged with the object of interest.

Further, even when the frame sections 21 of the shift marks 20 are not clearly shown so as to be visually understandable, the selected object can be disposed in the position of the object of interest potentially, and therefore, if the object of interest is made a blank object, and thereafter, an object of a size that can be interchanged with the selected object is disposed in the blank object, it can be determined in a short time that the selected object can be interchanged with the object of interest.

Further, according to the present embodiment, the shift mark 20 is held down (is kept pressed down), whereby the perimeter frame of the object of interest of a switching destination is clearly shown so as to be visually understandable.

Consequently, the interchange destination of the selected object can be clearly understood at a glance through vision, an operation can be performed in an extremely short time, and an erroneous operation can be prevented.

For example, when a person sitting in a passenger seat operates the car navigation device 1 while the vehicle is traveling, the person can clearly understand the interchange destination of the object, and can complete the interchange operation of the objects by an operation in a short time, even if the person can perform the operation of the car navigation device 1 only during stoppage of the vehicle for waiting at a red signal.

Although the present invention is described on the basis of one embodiment thus far, the present invention is not limited to the embodiment. Since the embodiment only illustrates one embodiment of the present invention, changes and applications can be made arbitrarily within the range without departing from the gist of the present invention.

Figure 13:
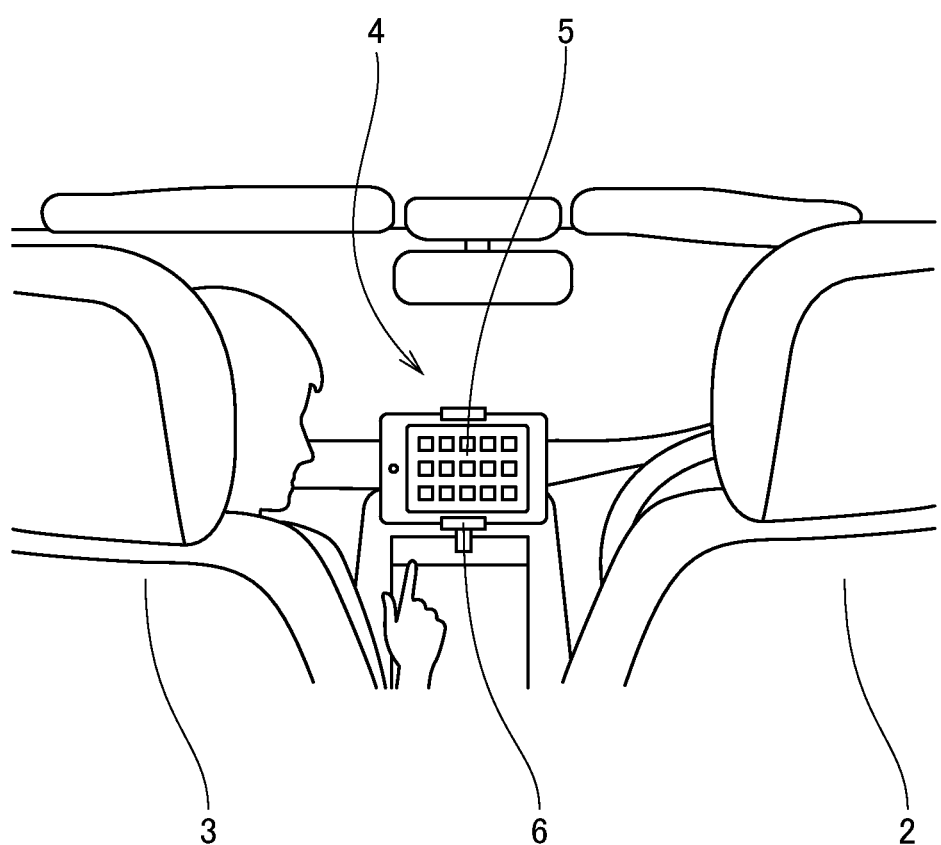
FIG. 13 is a diagram showing a vehicle-mounted information device according to another embodiment.

For example, although in the present embodiment, the car navigation device 1 which is fixed to the interior of the vehicle is illustrated, a docking station 6, for example, may be disposed in the vehicle as shown in FIG. 13. As the vehicle-mounted information device, a portable smartphone 5 or a tablet PC is docked with the docking station 6 at the time of driving, and the objects displayed in the smartphone 5 or the tablet PC may be made interchangeable.

REFERENCE SIGNS LIST

1 Car navigation device (vehicle-mounted information device)
10 First edit screen
11 to 18 Icon
13a to 18a Addition section
20 (20a, 20b, 20c) Mark (Shift mark)
21 (21a, 21b, 21c) Frame section
24 Perimeter frame
30 Second edit screen
40 Third edit screen
100 Control section
110 Storage section
121 Touch panel

The invention claimed is:

1. A vehicle-mounted information device comprising:
a CPU including a control section; and
a display device provided with a touch panel and displaying a plurality of objects as a matrix,
wherein a shift instruction to shift to an edit mode capable of editing the plurality of objects displayed as the matrix on the display device is provided via the touch panel,
when one object is selected in an initial state in the edit mode or is selected by a user as a selected object from among the objects displayed as the matrix, and when an interchange target object, which includes one or a group of the objects of interest having a display form substantially equal to the selected object among the plurality of objects displayed as the matrix and is displayed adjacently to at least one of right side, left side, upper side, and lower side of the selected object, exists, the control section displays a mark indicating a direction in which the interchange target object exists, and the mark is displayed in a space between the selected object and the interchange target object and on a perimeter of the selected object at least one of at a left side of, a right side of, an upper side of and a lower side of the selected object, the mark as a whole is displayed without overlapping with the selected object and the interchange target object, when the interchange target object does not exist, the control section does not display the mark, the control section does not display the mark against the object displayed as the matrix other than the selected object, the display form substantially equal to the selected object includes one of:

a first display form in which a width and a height of one object of interest are equal to a width and a height of the selected object;

a second display form in which each of the entire group of the objects of interest differs in size from the selected object, and a height H of a display region of the entire group of the objects of interest is equal to a height of a display region of the selected object, and widths of individual display regions of the group of the objects of interest are within a width W of a display region of a largest object of interest; and a third display form in which each of the entire group of the objects of interest differs in size from the selected object, a width W of the display region of the entire group of the objects of interest is equal to a width of the display region of the selected object, and heights of the individual display regions of the group of the objects of interest are within a height H of the display region of the largest object of interest, when the control section displays the selected object and the interchange target object in one of the first display form, the second display form, and the third display form on the display device, and the touch panel detects a touch operation of the mark by the user in the edit mode, the control section interchanges a position of the selected object and a position of the interchange target object which is located in the direction indicated by the mark.

2. The vehicle-mounted information device according to claim 1, wherein by keeping the mark pressed down, the one or group of the objects of interest that can be interchanged is or are displayed to be recognizable.

3. The vehicle-mounted information device according to claim 1, wherein a delete section is displayed in the selected object.

4. The vehicle-mounted information device according to claim 1, wherein an addition section is displayed in the selected object.

5. The vehicle-mounted information device according to claim 1, wherein in the edit mode, when selecting the selected object, a perimeter frame is displayed surrounding a periphery of the selected object, and other than the selected object, the perimeter frame is not displayed in the objects displayed as the matrix, the mark is displayed in a space between the perimeter frame of the selected object and the interchange target object, and is displayed at least one of right side, left side, upper side, and lower side of the perimeter frame of the selected object.

* * * * *